(12) United States Patent
Mathew et al.

(10) Patent No.: US 8,325,432 B2
(45) Date of Patent: Dec. 4, 2012

(54) SYSTEMS AND METHODS FOR SERVO DATA BASED HARMONICS CALCULATION

(75) Inventors: George Mathew, San Jose, CA (US);
Xun Zhang, Westford, MA (US);
Hongwei Song, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 19 days.

(21) Appl. No.: 12/851,455

(22) Filed: Aug. 5, 2010

(65) Prior Publication Data
US 2012/0033323 A1 Feb. 9, 2012

(51) Int. Cl.
*G11B 27/36* (2006.01)
*G11B 21/02* (2006.01)

(52) U.S. Cl. ............................................. 360/31; 360/75
(58) Field of Classification Search .................... None
See application file for complete search history.

(56) References Cited

U.S. PATENT DOCUMENTS

| | | | |
|---|---|---|---|
| 4,715,257 A | 12/1987 | Endo et al. | |
| 4,777,544 A | 10/1988 | Brown et al. | |
| 5,086,475 A | 2/1992 | Kageyama et al. | |
| 5,111,727 A | 5/1992 | Rossum | |
| 5,377,058 A | 12/1994 | Good et al. | |
| 5,814,750 A | 9/1998 | Read et al. | |
| 6,519,102 B1 | 2/2003 | Smith et al. | |
| 7,038,875 B2 | 5/2006 | Lou et al. | |
| 7,158,325 B1 | 1/2007 | Hu et al. | |
| 2005/0046982 A1 | 3/2005 | Liu et al. | |
| 2007/0268615 A1 | 11/2007 | McFadyen et al. | |
| 2009/0268322 A1* | 10/2009 | Annampedu et al. | 360/29 |
| 2009/0299666 A1 | 12/2009 | Kang et al. | |
| 2010/0177430 A1* | 7/2010 | Mathew et al. | 360/75 |
| 2011/0043938 A1* | 2/2011 | Mathew et al. | 360/31 |
| 2011/0249361 A1* | 10/2011 | Mathew et al. | 360/75 |

FOREIGN PATENT DOCUMENTS

| | | |
|---|---|---|
| WO | WO 02/93546 | 11/2001 |

OTHER PUBLICATIONS

U.S. Appl. No. 12/851,425, filed Aug. 5, 2010, Mathew et al.
U.S. Appl. No. 12/856,782, filed Aug. 16, 2010, Mathew et al.
U.S. Appl. No. 12/875,734, filed Sep. 3, 2010, Mathew et al.
Fertner, A. "Frequency-Domain Echo Canceller With Phase Adjustment" IEEE Trans. on circuits and Systems-II; Analog and Digital Signal Processing, vol. 44, No. 10, Oct. 1997.
Liu, et al., "Head Disk Spacing Variation Suppression via Active Flying Height Control" IEEE Instrumentation and Measurement Technology Conf. Budapest, Hungary May 21-23, 2001.

* cited by examiner

*Primary Examiner* — Regina N Holder
(74) *Attorney, Agent, or Firm* — Hamilton DeSanctis & Cha

(57) ABSTRACT

Various embodiments of the present invention provide systems and methods for servo data based harmonics calculation. For example, a circuit for determining harmonics is disclosed that includes an analog to digital conversion circuit that provides a series of digital samples corresponding to a pattern within a servo data region of a storage medium, and a harmonic calculation circuit. The harmonic calculation circuit is operable to calculate a first harmonic value for the series of digital samples, calculate a second harmonic value for the series of digital samples, and calculate a ratio of the first harmonic value to the second harmonic value.

20 Claims, 4 Drawing Sheets

SYSTEMS AND METHODS FOR SERVO DATA BASED HARMONICS CALCULATION

BACKGROUND OF THE INVENTION

The present inventions are related to systems and methods for transferring information to and from a storage medium, and more particularly to systems and methods for positioning a sensor in relation to a storage medium.

Various electronic storage media are accessed through use of a read/write head assembly that is positioned in relation to the storage medium. The read/write head assembly is supported by a head actuator, and is operable to read information from the storage medium and to write information to the storage medium. The distance between the read/write head assembly and the storage medium is typically referred to as the fly height. Control of the fly height is critical to proper operation of a storage system. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature crash of the storage device.

In a typical storage device, fly height is set to operate in a predetermined range. During operation, the fly height is periodically measured to assure that it continues to operate in the predetermined region. A variety of approaches for measuring fly height have been developed including optical interference, spectrum analysis of a read signal wave form, and measuring a pulse width value of the read signal. Such approaches in general provide a reasonable estimate of fly height, however, they are susceptible to various errors. In some cases, fly height has been measured by utilizing harmonic measurements based upon periodic data patterns written to the user data regions of a storage medium. Such approaches are problematic as they reduce the amount of storage that may be maintained on a given storage medium.

Hence, for at least the aforementioned reasons, there exists a need in the art for advanced systems and methods for positioning a sensor in relation to a storage medium.

BRIEF SUMMARY OF THE INVENTION

The present inventions are related to systems and methods for transferring information to and from a storage medium, and more particularly to systems and methods for positioning a sensor in relation to a storage medium.

Various embodiments of the present invention provide circuits for determining harmonics. Such circuits include an analog to digital conversion circuit that provides a series of digital samples corresponding to a pattern within a servo data region of a storage medium, and a harmonic calculation circuit. The harmonic calculation circuit is operable to calculate a first harmonic value for the series of digital samples, calculate a second harmonic value for the series of digital samples, and calculate a ratio of the first harmonic value to the second harmonic value. In some cases, the circuits are further operable to calculate a harmonics ratio across multiple servo data regions and to average the harmonics ratios together yielding an average ratio. In some such cases, the circuits may be further operable to calculate the average of the two harmonic values computed from across multiple servo data regions and to take the ratio of the first harmonic average to the second harmonic average to yield another average harmonic ratio. In some instances of the aforementioned embodiments, the pattern is a periodic burst demodulation pattern. In some such cases, the periodic burst demodulation pattern is a half rate pattern. In other cases, the periodic burst demodulation pattern is a quarter rate pattern.

Other embodiments of the present invention provide methods for determining fly height. The methods include providing a harmonics calculation circuit operable to receive a series of digital samples corresponding to a pattern within a servo data region of a storage medium; calculating a first harmonic value for the series of digital samples; calculating a second harmonic value for the series of digital samples; and calculating a ratio of the first harmonic value to the second harmonic value. In some instances of the aforementioned embodiments, the pattern is a periodic burst demodulation pattern. In some such cases, the periodic burst demodulation pattern is a half rate pattern. In other cases, the periodic burst demodulation pattern is a quarter rate pattern.

In some instances of the aforementioned embodiments, the series of digital samples is a first series of digital samples corresponding to the periodic pattern within a first servo data region of the storage medium and the ratio of the first harmonic value to the second harmonic value is a first ratio. In such cases, the methods further include calculating a third harmonic value for a second series of digital samples corresponding to the periodic pattern within a second servo data region of the storage medium; calculating a fourth harmonic value for the second series of digital samples; calculating a second ratio, wherein the second ratio is of the third harmonic value to the fourth harmonic value; and averaging at least the first ratio with the second ratio to yield an average ratio.

Yet other embodiments of the present invention provide storage devices that include: a storage medium, a read/write head assembly disposed in relation to the storage medium, an analog to digital converter circuit, and a harmonic calculation circuit. The storage medium includes at least a first servo data region and a second servo data region. The read/write head assembly is disposed in relation to the storage medium, and is operable to provide an electrical signal corresponding to the first servo data region and the second servo data region. The analog to digital converter circuit is operable to convert a derivative of the electrical signal to a first series of digital samples corresponding to a pattern in the first servo data region and to a second series of digital samples corresponding to the pattern in the second servo data region. The harmonic calculation circuit is operable to: calculate a first harmonic value for the first series of digital samples; calculate a second harmonic value for the first series of digital samples; calculate a first ratio of the first harmonic value to the second harmonic value; calculate a third harmonic value for the second series of digital samples; calculate a fourth harmonic value for the second series of digital samples; and calculate a second ratio of the third harmonic value to the fourth harmonic value. In some cases, the storage device includes a fly height calculation circuit operable to determine a distance of the read/write head assembly from the storage medium based at least in part on the first ratio.

In some instances of the aforementioned embodiments, the harmonic calculation circuit is further operable to average at least the first ratio with the second ratio to yield an average ratio. In some other instances of the aforementioned embodiments, the harmonic calculation circuits may be further operable to calculate the average of the two harmonic values computed from two servo data regions and to take the ratio of the first harmonic average to the second harmonic average to yield another average harmonic ratio. In some such cases, the storage device includes a fly height calculation circuit operable to determine a distance of the read/write head assembly from the storage medium based at least in part on the average ratio.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 4b is a cross sectional view showing the relationship between the disk platter and the read/write head assembly of the storage device of FIG. 4a.

DETAILED DESCRIPTION OF THE INVENTION

The present inventions are related to systems and methods for transferring information to and from a storage medium, and more particularly to systems and methods for positioning a sensor in relation to a storage medium.

Figure 1:
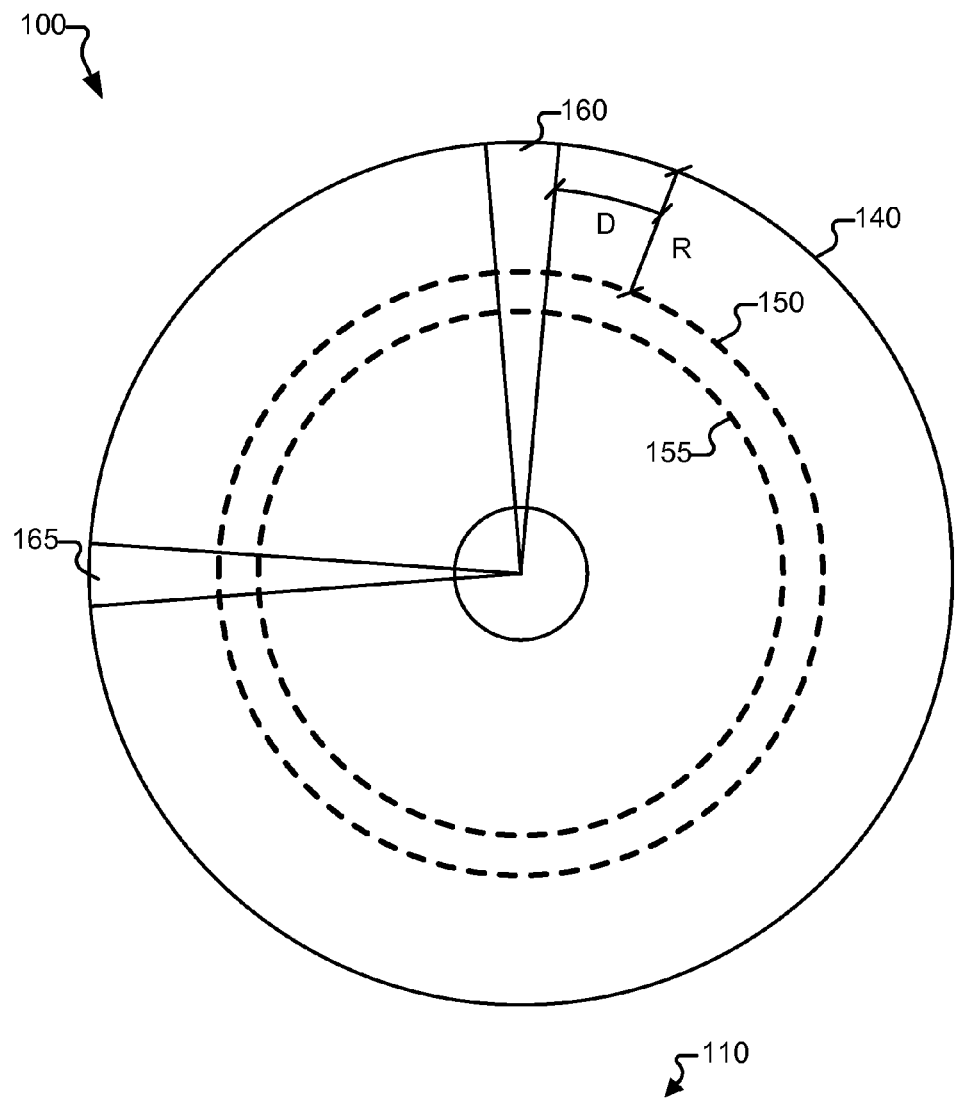
FIG. 1 depicts an existing storage medium including servo data.

Turning to FIG. 1, a storage medium 100 is shown with two exemplary tracks 150, 155 indicated as dashed lines. The tracks are segregated by servo data written within wedges 160, 165. These wedges include servo data 110 that are used for control and synchronization of the read/write head assembly over a desired location on storage medium 100. In particular, this servo data generally includes a preamble pattern 152 followed by a servo address mark 154 (SAM). Servo address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 158. Between the bit patterns 110, a user data region 184 is provided.

Various embodiments of the present invention utilize periodic information from the servo data to perform fly height calculations. Such may be done by calculating two frequency harmonics from the sampled periodic data, and then calculating a ratio of the two frequency harmonics. This ratio of frequency harmonics may then be used in known fly height calculations to provide fly height feedback governing the distance of a head from a storage medium. As just some advantages, using periodic data derived from the servo data regions of a storage medium allows for on-line fly height calculation as data from the servo data regions is continuously read in order to track the location of the head relative to the storage medium. Such on-line fly height calculations do not necessarily require interrupting regular read and write operations carried out in relation to a storage medium. Further, fly height can be accurately calculated during both read and write operations. As another advantage, storage space on the storage medium is preserved for other uses when periodic data from the servo data regions is used for fly height calculation. This results in improved format efficiency as portions of the user data region are not allocated to fly height control. Further, one or more embodiments of the present invention utilize existing burst demodulation data. Based upon the disclosure provided herein, one of ordinary skill in the art will recognize a variety of other advantages that may be achieved by implementation of circuits, systems and methods in accordance with the different embodiments of the present invention.

Figure 2:
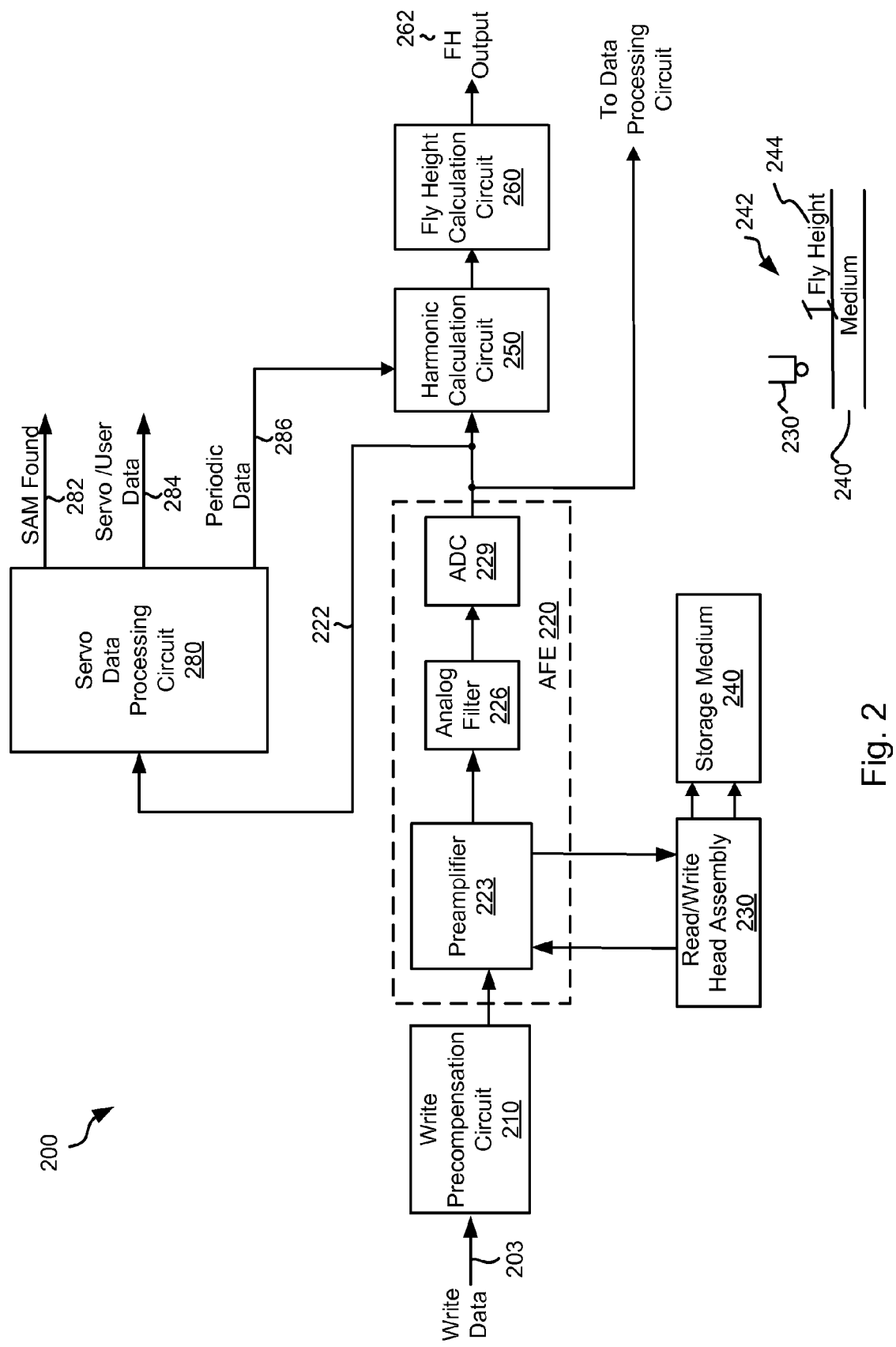
FIG. 2 depicts a servo data based harmonics calculation circuit in accordance with one or more embodiments of the present invention.

Turning to FIG. 2, a servo data based harmonics calculation circuit 200 is depicted in accordance with one or more embodiments of the present invention. Servo data based harmonics calculation circuit 200 includes a write precompensation circuit 210 that receives data to be written to a storage medium 240 in a digital form and provides an analog representation of the received data to an analog front end circuit 220. Write precompensation circuit 210 may be any circuit known in the art that accepts data and prepares it for writing to a storage medium. The data provided to write precompensation circuit 210 may be a standard write data 203 derived from an upstream data circuit (not shown). Standard write data 203 may be a series of digital bits and may be provided by any circuit known in the art that provides information to be written to a storage medium. Based upon the disclosure provided herein, one of ordinary skill in the art will recognize a variety of write precompensation circuits and/or standard write data 203.

Write precompensation circuit 210 provides a continuous write signal to an analog front end circuit 220. Analog front end circuit 220 may be any analog front end circuit known in the art. As shown, analog front end circuit 220 includes a preamplifier circuit 223, an analog filter circuit 226, and analog to digital converter circuit 229. The continuous write signal from write precompensation circuit 210 is received by preamplifier circuit 223 that amplifies the signal and provides the amplified result to a read/write head assembly 230 that causes information corresponding to the signal to be written to a storage medium 240. In some embodiments, the storage medium is a magnetic storage medium, and the read/write head assembly converts the signal from preamplifier circuit 223 to magnetic information suitable for storage and later retrieval from storage medium 240. Based upon the disclosure provided herein, one of ordinary skill in the art will recognize a variety of read/write head assemblies and storage media that may be used in relation to different embodiments of the present invention.

When data is read back from storage medium 240 by read/write head assembly 230, an electrical signal representing the data is transferred to preamplifier circuit 223 where it is amplified and passed to analog filter circuit 226. Analog filter circuit 226 filters the received signal and provides a corresponding filtered signal to analog to digital converter circuit 229. Analog to digital converter circuit 229 provides a series of digital samples 222 corresponding to the received data. Digital samples 222 are provided to a downstream data processing circuit (not shown), or other recipient circuit.

In addition, digital samples 222 are provided to a servo data processing circuit 280. Servo data processing circuit 280 may be any circuit known in the art that is capable of receiving an input data stream, and identifying and processing servo data fields in the input data stream. Such servo data fields may include, but are not limited to, a preamble pattern, a servo address mark pattern, a gray code pattern and a burst demodulation pattern (i.e., the position error sensing information). For use in the present inventions, the burst demodulation pattern is a periodic pattern exhibiting two or more frequency harmonics. In one embodiment of the present invention, the burst demodulation pattern is a half rate pattern as are known in the art. Where a half rate pattern is used, the first and third harmonics of the half rate pattern may be used. In other embodiments of the present invention, the burst demodulation pattern is a quarter rate pattern as are known in the art. Where a quarter rate pattern is used, the third and the fifth harmonics of the quarter rate pattern may be used. Alternatively, any two of the first, third, fifth and seventh harmonics of the quarter rate pattern may be used. Based upon the disclosure provided herein, one of ordinary skill in the art will recognize a variety of periodic patterns within the servo data region offering two or more harmonics that may be used in relation to different embodiments of the present invention.

Servo data processing circuit 280 provides an output 284 indicating that servo data or user data is being received, an output 282 indicating that the servo address mark is found, and an output 286 indicating that periodic data suitable for harmonic calculations is available. In some instances, the suitable periodic data is burst demodulation data included as part of the servo data. In such cases, output 286 is asserted for a period that the burst demodulation data is available as part of digital samples 222.

Digital samples 222 and output 286 are provided to a harmonic calculation circuit 250. In describing the operation of harmonic calculation circuit 250, let x[n], for n equal to 0, 1, 2 ... N−1 denote one cycle of the periodic data sampled from the received servo data. Where, for example, the periodic data is a quarter rate burst demodulation data, N is equal to sixteen. As another example, where the periodic data is a half rate burst demodulation data, N is equal to eight. Each of the received samples, x[n], are gain adjusted. If there are M cycles of the periodic pattern (half-rate or quarter-rate) these periods may be averaged together to result in an averaged cycle of data samples for use in computing the harmonic values. Further, samples from multiple servo sectors may be used by averaging the harmonic values from multiple sectors together and taking the ratio of the averaged harmonic values. Alternatively, where samples from across multiple sectors are to be used, a harmonic ratio for a given sector may be calculated, and a running average of the absolute values of harmonic ratios for a number of sectors or servo data sets may be calculated. Using data from multiple sectors or servo data sets reduces the effect of noise in computed values of harmonic strengths and harmonic ratio.

Based on the aforementioned, harmonic calculation circuit 250 calculates harmonics for the frequencies of interest in accordance with the following equation:

$$H_k = \sum_{n=0}^{N-1} x[n] \cdot c_k[n] - j \sum_{n=0}^{N-1} x[n] \cdot s_k[n], \text{ where}$$

$$x[n] = \frac{1}{M} \sum_{l=0}^{M-1} y(n + lN).$$

Here, y[n] denotes M cycles of the samples of the periodic data from a servo burst region in a sector before averaging and x[n] denotes one cycle of these samples after averaging. Further, $c_k[n]$ and $s_k[n]$ denote the discrete Fourier transform (DFT) kernals for the k-th harmonic. For a half rate burst demodulation pattern where $k \in \{1,3\}$, the values of $c_k[n]$ and $s_k[n]$ are as follow:

$c_1[n]=\{1.00, 0.7071, 0.00, -0.7071, -1.00, -0.7071, 0.00, 0.7071\};$ $s_1[n]=\{0.00, 0.7071, 1.00, 0.7071, 0.00, -0.7071, -1.00, 0.7071\};$ $c_3[n]=\{1.00, -0.7071, 0.00, 0.7071, -1.00, 0.7071, 0.00, -0.7071\};$ and $s_1[n]=\{0.00, 0.7071, -1.00, 0.7071, 0.00, -0.7071, 1.00, -0.7071\}.$ For a quarter rate burst demodulation pattern where $k \in \{1,3, 5,7\}$, the following values of $c_k[n]$ and $s_k[n]$ are as follow:

$$\{c_k[n], s_k[n]\} = \begin{bmatrix} 1.000 & 0.000 \\ 0.9239 & 0.3827 \\ 0.7071 & 0.7071 \\ 0.3827 & 0.9239 \\ 0.000 & 1.000 \\ -0.3827 & 0.9239 \\ -0.7071 & 0.7071 \\ -0.9239 & 0.3827 \\ -1.000 & 0.000 \\ -0.9239 & -0.3827 \\ -0.7071 & -0.7071 \\ -0.3827 & -0.9239 \\ -0.000 & -1.000 \\ 0.3827 & -0.9239 \\ 0.7071 & -0.7071 \\ 0.9239 & -0.3827 \end{bmatrix} \begin{bmatrix} 1.000 & 0.000 \\ 0.3827 & 0.9239 \\ -0.7071 & 0.7071 \\ -0.9239 & -0.3827 \\ -0.000 & -1.000 \\ 0.9239 & -0.3827 \\ 0.7071 & 0.7071 \\ -0.3827 & 0.9239 \\ -1.000 & 0.000 \\ -0.3827 & -0.9239 \\ 0.7071 & -0.7071 \\ 0.9239 & 0.3827 \\ 0.000 & 1.000 \\ -0.9239 & 0.3827 \\ -0.7071 & -0.7071 \\ 0.3827 & -0.9239 \end{bmatrix}$$
$$k=1 \qquad\qquad k=3$$

$$\begin{bmatrix} 1.000 & 0.000 \\ -0.3827 & 0.9239 \\ -0.7071 & -0.7071 \\ 0.9239 & -0.3827 \\ 0.000 & 1.000 \\ -0.9239 & -0.3827 \\ 0.7071 & -0.7071 \\ 0.3827 & 0.9239 \\ -1.000 & 0.000 \\ 0.3827 & -0.9239 \\ 0.7071 & 0.7071 \\ -0.9239 & 0.3827 \\ -0.000 & -1.000 \\ 0.9239 & 0.3827 \\ -0.7071 & 0.7071 \\ -0.3827 & -0.9239 \end{bmatrix} \begin{bmatrix} 1.000 & 0.000 \\ -0.9239 & 0.3827 \\ 0.7071 & -0.7071 \\ -0.3827 & 0.9239 \\ -0.000 & -1.000 \\ 0.3827 & 0.9239 \\ -0.7071 & -0.7071 \\ 0.9239 & 0.3827 \\ -1.000 & 0.000 \\ 0.9239 & -0.3827 \\ -0.7071 & 0.7071 \\ 0.3827 & -0.9239 \\ -0.000 & 1.000 \\ -0.3827 & -0.9239 \\ 0.7071 & 0.7071 \\ -0.9239 & -0.3827 \end{bmatrix}$$
$$k=5 \qquad\qquad k=7$$

It should be noted that other values may be used in relation to different embodiments of the present invention.

Based on the aforementioned, harmonic calculation circuit 250 calculates squared values of the harmonics for the frequencies of interest in accordance with the following equation:

$$|H_k|^2 = H_{k,r}^2 + H_{k,i}^2 \text{ where } H_{k,r} = \sum_{n=0}^{N-1} x[n] \cdot c_k[n],$$

$$H_{k,i} = \sum_{n=0}^{N-1} x[n] \cdot s_k[n].$$

Here, $H_{k,r}$ and $H_{k,i}$ are the real and imaginary parts, respectively, of the strength $H_k$ of k-th harmonic. To minimize noise effect on these estimated harmonic strengths, as explained earlier, the harmonic strengths estimated from multiple sectors may be averaged together in accordance with the following equation:

$$S_k = \frac{1}{N_s} \sum_{l=1}^{N_s} \{|H_k|^2 \text{ from } l\text{-}th \text{ sector}\}$$

where $N_s$ is the number of sectors used for averaging. The harmonic ratio is computed from $S_k$ in accordance with the following equation:

$$R(k_1, k_2) = \frac{S_{k1}}{S_{k2}}$$

where $(k_1, k_2)$ is equal to $(1, 3)$ for half-rate pattern and any pair from among $\{1, 3, 5, 7\}$ for quarter-rate pattern.

The harmonic ratio calculated by harmonic calculation circuit 250 is provided to a fly height calculation circuit 260 that calculates a fly height 244 and provides a fly height output 262 to a fly height controller (not shown). The fly height calculation may be any harmonic based fly height calculation known in the art. As shown in cross section 242, fly height 244 is a distance from read/write head assembly 230 to the surface of storage medium 240.

In operation, whenever data is being read from storage medium 240 or written to storage medium 240 servo data is being read from storage medium 240 as part of tracking the location of read/write head assembly 230 relative to storage medium 240. As this servo data is provided from analog to digital converter circuit 229, servo processing circuit 280 asserts outputs 282, 284, 286 as each of the relevant regions of the servo data are identified. In particular, when the servo data is being processed, output 284 is asserted high. When the servo address mark is identified, output 282 is asserted high. When the periodic data is identified, output 286 is asserted high. In some cases, the periodic data is at a known number of sample periods from the servo address mark. Again, in some embodiments of the present invention, the periodic data that is used is the burst demodulation data that is at a defined distance from the servo address mark. Thus, in such a case, output 286 is asserted high a defined time after the servo address mark is identified and remains asserted until the end of the burst demodulation data.

When output 286 is asserted high, harmonic calculation circuit 250 accepts digital samples 222 and calculates respective harmonic values. In particular, harmonic sensing is performed by harmonic calculation circuit on the periodic data pattern represented by digital samples 222 to determine a harmonic of a first frequency and one of a second frequency. Where, for example, the burst demodulation information is half rate, both the fundamental harmonic of the pattern and the third harmonic of the pattern are calculated. In one particular embodiment of the present invention, the harmonic sensing is done using a discrete Fourier transform that yields the fundamental and the third harmonic. Subsequently, the fundamental harmonic strength is divided by the third harmonic strength to yield a harmonic ratio that is provided to a fly height calculation circuit 260. In turn, the harmonic ratio is used by fly height calculation circuit 260 to calculate a fly height compensation value as is known in the art. The calculated value is provided as a fly height output 262.

Again, it should be noted that in various embodiments of the present invention, harmonic calculation circuit 250 further includes a running average circuit that averages several measurements of the two harmonics or harmonic ratios derived from periodic data gathered across several servo data regions (or several sectors) to reduce noise effects. When running average of the measurements of the two harmonics for several servo data regions are obtained, their ratio is used as the average harmonic ratio. When ratio of the two harmonics are obtained from each servo data region, average of this ratio over all servo data regions is used as the averaged harmonic ratio. In one particular embodiment of the present invention, forty or more wedges or servo data regions are used for doing this averaging process. The averaged harmonic ratio is used by fly height calculation circuit 260 to yield fly height output 262.

Figure 3:
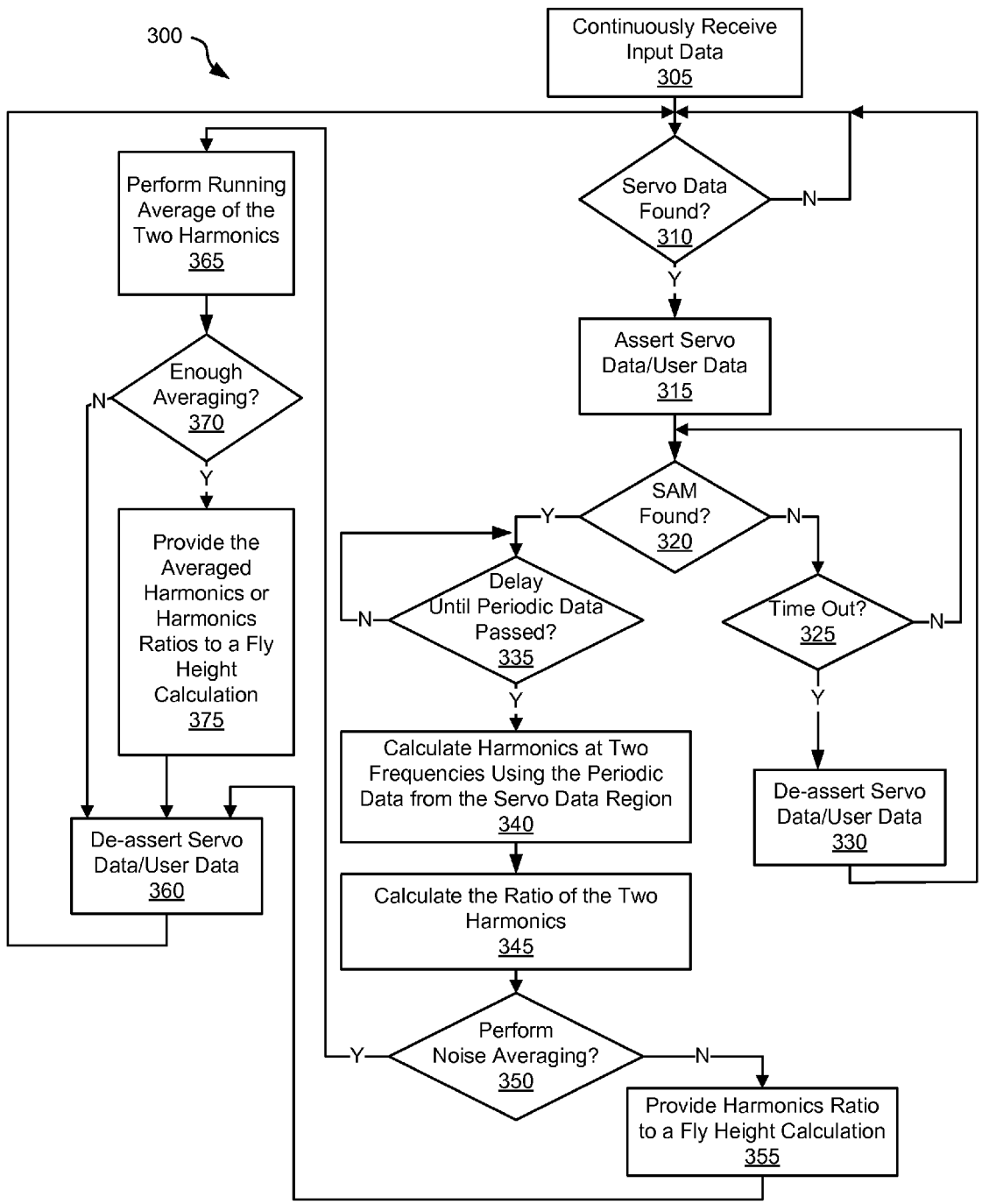
FIG. 3 is a flow diagram showing a method in accordance with some embodiments of the present invention for performing servo data based harmonics calculation.

Turning to FIG. 3, a flow diagram 300 depicts a method in accordance with some embodiments of the present invention for performing servo data based harmonics calculation. Following flow diagram 300, a series of data inputs are received (block 305). The data inputs are derived from both the user data region and servo data regions. This process may be applied to both read and write data scenarios. During a read scenario, the data is read from user data regions followed by servo data regions. During a write scenario, data is written to the user data region followed by a switch to a read of data from servo data regions. In some cases, the data received during a write scenario includes some samples of the user data region directly preceding the servo data region followed by samples from the servo data region. Of note, the approach discussed herein allows for performing harmonics calculations based on periodic data patterns included within the servo data region that are always available in both read scenarios and write scenarios due to the need for tracking the location of the read/write head assembly relative to the disk.

As the data is received, it is determined whether the data is from a servo data region (a wedge) or from a user data region (block 310). In some cases, this process includes looking for a preamble that is part of the servo data region using processes known in the art. Once the servo data region is identified (block 310), a servo data/user data signal is asserted indicating that the data being received is from the servo data region (block 315). The servo data processing continues processing the preamble data as is known in the art. Once the preamble data is processed, the servo address mark (SAM) data is received and processed as is known in the art. As part of receiving the SAM, it is determined whether the SAM has been found (block 320). Where it is not yet found (block 320), it is determined whether a timeout condition has occurred (block 325). Such a timeout condition avoids a never ending look for the SAM. Where a timeout has not occurred (block 325), the process of looking for the SAM is continued (block 320). Alternatively, where a timeout condition has occurred (block 325), the servo data/user data signal is de-asserted indicating that the data being received is not from the servo data region (block 330).

Alternatively, where the SAM is found (block 320), it is determined whether a defined number of sample periods have passed since the finding of the SAM (block 335). The burst demodulation information is at a known distance from the SAM. Thus, once the SAM is found, the location of the burst demodulation is known. Once the delay has passed (block 335), harmonics for two different frequencies are calculated using the received burst demodulation information (block 340). In one particular embodiment of the present invention where half rate demodulation data is available, harmonics for the fundamental frequency and a third harmonic frequency are calculated. Next, a ratio of the strengths of fundamental harmonic to the third harmonic is calculated by dividing the harmonic corresponding to the fundamental frequency by the harmonic corresponding to the third harmonic frequency to yield a harmonic ratio (block 345).

It is then determined whether harmonic information from multiple sectors are to be averaged to reduce noise (block 350). Where noise averaging is not employed (block 350), the harmonics ratio calculated based upon the servo data for a single sector is provided to a fly height calculation circuit (block 355). In addition, the servo data/user data signal is de-asserted indicating that the data being received is not from the servo data region (block 360).

Alternatively, where noise averaging is employed (block 350), the strength of the two harmonics or their harmonic ratio calculated based upon the servo data for a single sector are averaged together with the harmonics or harmonic ratios calculated based on data derived from a number of other sectors (block 365). Such an approach operates to reduce the effects of noise on the measured harmonics. In some cases, the noise averaging includes taking the absolute values or squared values of the harmonics calculated for the immediate sector and averaging that with the absolute values or squared values of the harmonics for a number of other sectors. In some other cases, the noise averaging includes taking the absolute value of the harmonic ratio calculated for the immediate sector and averaging that with the absolute values of the harmonic ratio for a number of other sectors. In one particular embodiment, a running average of harmonics from one hundred or more sectors is maintained. It is determined if harmonics from enough sectors have been included in the average (block 370). Thus, for example, in the aforementioned running average situation, it is determined whether harmonics from more than one hundred sectors have been incorporated in the running average. Where harmonics from a sufficient number of sectors have not yet been incorporated (block 370), the servo data/user data signal is de-asserted indicating that the data from more servo data regions should be used in the averaging process (block 360). Alternatively, where harmonics from sufficient number of sectors have been incorporated (block 370), the averaged harmonics ratio is provided to a fly height calculation circuit (block 375). In addition, the servo data/user data signal is de-asserted indicating that the data from next servo region is collected for continuing the harmonics computation process (block 360). It should be noted that while the discussion herein suggests that noise averaging is done by averaging harmonic ratios that other embodiments of the present invention may perform noise averaging by averaging the underlying harmonics.

Figure 4A:
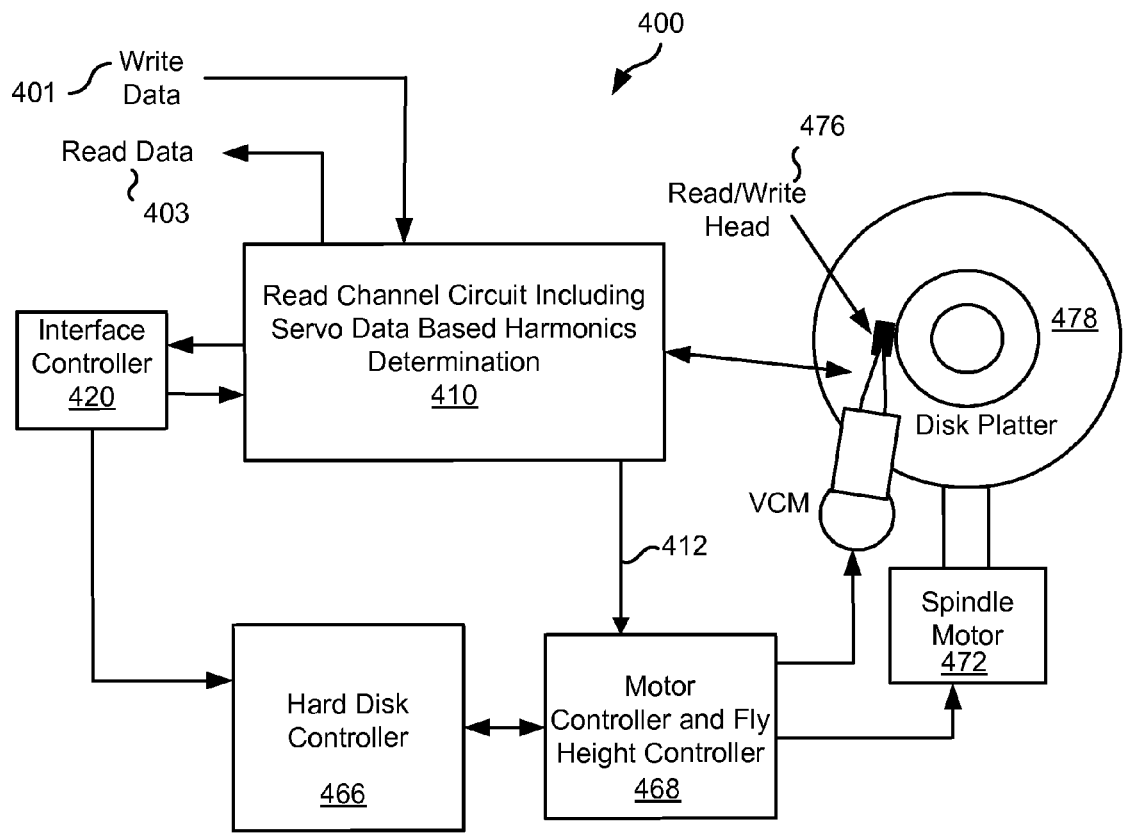
FIG. 4a depicts a storage device including a read channel including servo data based harmonics calculation in accordance with one or more embodiments of the present invention.
Figure 4B:
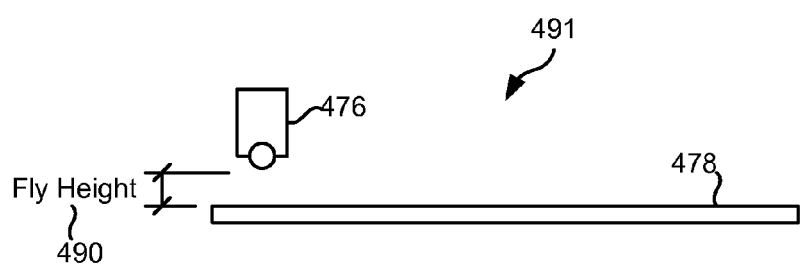

Turning to FIG. 4a, a storage device 400 including a read channel circuit 410 including servo data based harmonics determination is shown in accordance with one or more embodiments of the present invention. Storage device 400 may be, for example, a hard disk drive. Read channel circuit 410 includes servo data based harmonics determination that may be implemented consistent with that discussed in relation to FIG. 2 above, and/or may operate consistent with the method discussed above in relation to FIG. 3 above. Further, read channel circuit 410 may include a data detector, such as, for example, a Viterbi algorithm data detector, and/or a data decoder circuit, such as, for example, a low density parity check decoder circuit. In addition to read channel circuit 410, storage device 400 includes a read/write head assembly 476 disposed in relation to a disk platter 478. Read/write head assembly 476 is operable to sense information stored on disk platter 478 and to provide a corresponding electrical signal to read channel circuit 410.

Storage device 400 also includes an interface controller 420, a hard disk controller 466, a motor controller and fly height controller 468, and a spindle motor 472. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with a perpendicular recording scheme. In other embodiments of the present invention, disk platter 478 includes magnetic signals recorded in accordance with a longitudinal recording scheme. Motor controller and fly height controller 468 controls the spin rate of disk platter 478 and the location of read/write head assembly 476 in relation to disk platter 478.

As shown in a cross sectional diagram 491 of FIG. 6b, the distance between read/write head assembly 476 and disk platter 478 is a fly height 490. Fly height 490 is controlled by motor controller and fly height controller 468 based upon a harmonics value 412 provided by read channel circuit 410.

In a typical read operation, read/write head assembly 476 is accurately positioned by motor controller and fly height controller 468 over a desired data track on disk platter 478. Motor controller and fly height controller 468 both positions read/write head assembly 476 in relation to disk platter 478 (laterally and vertically) and drives spindle motor 472 by moving read/write head assembly 476 to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is provided by read/write head assembly 476 to read channel circuit 410. In turn, read channel circuit 410 decodes and digitizes the received analog signal to recreate the information originally written to disk platter 478. This data is provided as read data 403 to a receiving circuit. A write operation is substantially the opposite of the preceding read operation with write data 401 being provided to read channel circuit 410. This data is then encoded and written to disk platter 478.

At times, a signal derived from disk platter 478 may be processed to determine a harmonics value relevant to fly height. In some embodiments of the present invention, determining the harmonics value may be done consistent with the methods discussed above in relation to FIG. 3. In various cases, a circuit consistent with that discussed in relation to FIG. 2 above may be used. In various cases, fly height is re-evaluated when a change in operational status of storage device 400 is detected. Such an operational change may include, but is not limited to, a change in an operational voltage level, a change in an operational temperature, a change in altitude, or a change in bit error rate. Based upon the disclosure provided herein, one of ordinary skill in the art will recognize a variety of operational status that may be monitored in storage device 400, and how changes in such status may be utilized to trigger a re-evaluation of fly height.

In conclusion, the invention provides novel systems, devices, methods and arrangements for measuring harmonics. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A circuit for determining harmonics, the circuit comprising:
an analog to digital conversion circuit, wherein the analog to digital conversion circuit is operable to provide a first series of digital samples corresponding to a pattern within a first servo data region of a storage medium and a second series of digital samples corresponding to the pattern within a second servo data region of the storage medium;
a harmonic calculation circuit operable to:
calculate a first harmonic value for the first series of digital samples;
calculate a second harmonic value for the first series of digital samples;
calculate a first ratio of the first harmonic value to the second harmonic value;
calculate a third harmonic value for the second series of digital samples;
calculate a fourth harmonic value for the second series of digital samples;
calculate a second ratio of the third harmonic value to the fourth harmonic value; and
average at least the first ratio with the second ratio to yield an average ratio.

2. The circuit of claim 1, wherein the first harmonic value and the second harmonic value are calculated in accordance with the following equation:

$$H_k = \sum_{n=0}^{N-1} x[n] \cdot c_k[n] - j \sum_{n=0}^{N-1} x[n] \cdot s_k[n],$$

wherein k represents the harmonic, $x[n]$ represents individual samples of the series of digital samples, $c_k[n]$ represents a first programmed parameter, $s_k[n]$ represents a second programmed parameter, wherein N indicates the number of bits in the pattern, and j is a multiplier value.

3. The circuit of claim 1, wherein the pattern is a periodic burst demodulation pattern.

4. The circuit of claim 3, wherein the periodic burst demodulation pattern is a half rate pattern.

5. The circuit of claim 4, wherein the first harmonic value is first harmonic of the half rate pattern, and the second harmonic value is the third harmonic of the half rate pattern.

6. The circuit of claim 3, wherein the periodic burst demodulation pattern is a quarter rate pattern.

7. The circuit of claim 6, wherein the first harmonic value is third harmonic of the quarter rate pattern, and the second harmonic value is the fifth harmonic of the quarter rate pattern.

8. The circuit of claim 1, wherein the circuit is implemented as part of a storage device.

9. The circuit of claim 1, wherein the circuit is implemented as part of an integrated circuit.

10. A method for determining fly height, the method comprising:
providing a harmonics calculation circuit operable to receive a first series of digital samples corresponding to a pattern within a first servo data region of a storage medium, and to receive a second series of digital samples corresponding to the pattern within a second servo data region of the storage medium;
calculating a first harmonic value for the series of digital samples;
calculating a second harmonic value for the series of digital samples; and
calculating a first ratio of the first harmonic value to the second harmonic value:,
calculating a third harmonic value for the second series of digital samples;
calculating a fourth harmonic value for the second series of digital samples;
calculating a second ratio of the third harmonic value to the fourth harmonic value; and
averaging at least the first ratio with the second ratio to yield an average ratio.

11. The method of claim 10, wherein the pattern is a periodic burst demodulation pattern.

12. The method of claim 11, wherein the periodic burst demodulation pattern is a half rate pattern.

13. The method of claim 12, wherein the first harmonic value is first harmonic of the half rate pattern, and the second harmonic value is the third harmonic of the half rate pattern.

14. The method of claim 11, wherein the burst demodulation pattern is a quarter rate pattern.

15. The method of claim 14, wherein the first harmonic value is third harmonic of the quarter rate pattern, and the second harmonic value is the fifth harmonic of the quarter rate pattern.

16. The method of claim 10, wherein the first harmonic value and the second harmonic value are calculated in accordance with the following equation:

$$H_k = \sum_{n=0}^{N-1} x[n] \cdot c_k[n] - j \sum_{n=0}^{N-1} x[n] \cdot s_k[n],$$

wherein k represents the harmonic, $x[n]$ represents individual samples of the series of digital samples, $c_k[n]$ represents a first programmed parameter, $s_k[n]$ represents a second programmed parameter, wherein N indicates the number of bits in the pattern, and j is a multiplier value.

17. A storage device, the storage device comprising:
a storage medium including a first servo data region and a second servo data region;
a read/write head assembly disposed in relation to the storage medium, wherein the read/write head assembly is operable to provide an electrical signal corresponding to the first servo data region and the second servo data region;

an analog to digital converter circuit operable to convert a derivative of the electrical signal to a first series of digital samples corresponding to a pattern in the first servo data region and to a second series of digital samples corresponding to the pattern in the second servo data region; and a harmonic calculation circuit operable to:
- calculate a first harmonic value for the first series of digital samples;
- calculate a second harmonic value for the first series of digital samples;
- calculate a first ratio of the first harmonic value to the second harmonic value;
- calculate a third harmonic value for the second series of digital samples;
- calculate a fourth harmonic value for the second series of digital samples; and
- calculate a second ratio of the third harmonic value to the fourth harmonic value; and
- average at least the first ratio with the second ratio to yield an average ratio.

18. The storage device of claim 17, wherein the harmonic calculation circuit is further operable to:
- average at least the first ratio with the second ratio to yield an average ratio; and
- provide an average harmonic ratio by calculating the ratio of the average of the first and third harmonic values with the average of the second and fourth harmonic values.

19. The storage device of claim 18, wherein the storage device includes a fly height calculation circuit operable to determine a distance of the read/write head assembly from the storage medium based at least in part on the average ratio.

20. The storage device of claim 17, wherein the storage device includes a fly height calculation circuit operable to determine a distance of the read/write head assembly from the storage medium based at least in part on the first ratio.

* * * * *